United States Patent
Hofkens et al.

(10) Patent No.: US 6,898,629 B1
(45) Date of Patent: May 24, 2005

(54) PERSONALISED SERVICE GENERATION ENABLING DEVICE, A SERVICE CREATION ELEMENT AND RELATED SOFTWARE MODULES

(75) Inventors: Jurgen Louis Hofkens, Deurne (BE); Hans Vanderstraeten, Lebbeke (BE); Werner Adriaan Josephine Van Leekwijck, Antwerp (BE)

(73) Assignee: Alcatel, Paris (FR)

( * ) Notice: Subject to any disclaimer, the term of this patent is extended or adjusted under 35 U.S.C. 154(b) by 674 days.

(21) Appl. No.: 09/605,973

(22) Filed: Jun. 29, 2000

(30) Foreign Application Priority Data

Jul. 16, 1999 (EP) ............................................ 99401789

(51) Int. Cl.[7] .......................... G06F 15/177; H04M 3/42
(52) U.S. Cl. ................... 709/220; 709/221; 379/201.03
(58) Field of Search ................. 709/220, 223, 709/224, 219, 221; 379/201.03; 705/27

(56) References Cited

U.S. PATENT DOCUMENTS

| | | | | |
|---|---|---|---|---|
| 5,455,853 A | * | 10/1995 | Cebulka et al. | 379/201.03 |
| 5,701,419 A | * | 12/1997 | McConnell | 705/27 |
| 5,907,607 A | * | 5/1999 | Waters et al. | 379/201.03 |
| 5,991,803 A | * | 11/1999 | Glitho et al. | 709/220 |
| 6,336,138 B1 | * | 1/2002 | Caswell et al. | 709/223 |

FOREIGN PATENT DOCUMENTS

| | | |
|---|---|---|
| EP | 0 847 176 A2 | 6/1998 |
| WO | WO 95/34980 * | 12/1995 |
| WO | WO 98/54915 | 12/1998 |
| WO | WO 99/20060 | 4/1999 |

* cited by examiner

*Primary Examiner*—John Follansbee
*Assistant Examiner*—Kenny Lin
(74) *Attorney, Agent, or Firm*—Sughrue Mion, PLLC

(57) ABSTRACT

A personalised service generation enabling device generates information that enables a service creation element to generate a personalised telecommunications service based on a telecommunications service created by the service creation element. The device provides this telecommunications service to a user. Based on inputted change instructions and on the telecommunications service, the enabling device translates the change instructions into service generation information which is sent to the service creation element which generates a personalised telecommunications service based on the telecommunications service and on the change information. The personalised service is then installed in a relevant network element making the personalised service in this way accessible to the user.

8 Claims, 3 Drawing Sheets

PERSONALISED SERVICE GENERATION ENABLING DEVICE, A SERVICE CREATION ELEMENT AND RELATED SOFTWARE MODULES

BACKGROUND OF THE INVENTION

The present invention relates to a personalised service generation enabling device for generating information enabling a service creation element to generate a personalised telecommunications service based on a telecommunications service comprising at least one service component and created by said service creation element, a service creation element as for generating a personalised telecommunications service based on a telecommunications service and the related software modules as for running on a processing system in a personalised service generation enabling device and for generating information enabling a service creation element to generate a personalised telecommunications service, and for running on a processing system in a service creation element for generating the personalised telecommunications service.

Such a device and element are already known in the art, e.g. from the European Patent EP0847176, "USER INVOCATION OF SERVICES IN PUBLIC SWITCHED TELEPHONE NETWORK VIA PARALLEL DATA NETWORKS".

Therein, a method is described where a user of telecommunication services has facilities to make changes in the services a telecommunications service provider provides to this user. The user is able to access a telecommunications service provider's service change system by connecting with a computer to an internet-site of the telecommunications service provider. Via this internet-site, the user is provided with a number of forms guiding the user through the process of performing the changing of services while guarding against possible actions by customers that could be detrimental to the public switched telephone network. This form consists of a number of fields each representing a kind of changeable variable where a value or variable to be picked from a list can be filled in. These changes are immediately applied in the service creation environment or SCE. Thus the personalised service generation enabling device is here realised by means of the computer access to the forms.

In the current situation, that is the situation as described in the above prior art, the user is only able to change a restricted number of characteristics of the service having a restricted number of options. These changes are guided through a number of forms that only provide the user with a view to a restricted number of service aspects. The aspects within the view are the characteristics of the telecommunications service that can be changed. This service change facility does not suffice to adapt the provided service functionality to satisfy needs of a single user of the service.

SUMMARY OF THE INVENTION

An object of the present invention is to provide a device for realising service changes as in the system of the above known type but wherein the user is enabled to change the provided service in such a way that he can use his service in the most efficient way only offering him the functionality he needs to use.

According to the present invention, this object is achieved by a personalised service generation enabling device, for generating information enabling a service creation element to generate a personalised telecommunications service based on a telecommunications service comprising at least one service component and created by the service creation element, wherein the device comprises:

a. a telecommunications service accessor, adapted to provide the telecommunications service to a user;

b. a service generation information provider, having an input for receiving a change instruction and being adapted to translate the change instruction based on the telecommunications service received via the telecommunications service accessor, to a service generation information which can be handled by the service creation element to change the telecommunications service; and c. a service generation information transmitter having an input coupled to an output of the service generation information provider and adapted to send the service generation information to the service creation element to enable the service creation element to create the personalised telecommunications service.

The object of the invention is further achieved by a service creation element for generating a personalised telecommunications service based on a telecommunications service, the service creation element comprising:

a. a service creator, adapted to create a telecommunication service;

b. a personalised service creator, adapted to create a personalised telecommunications service;

c. a transmitter having an input coupled to an output of the service creator and adapted to provide a user with the telecommunications service;

d. a change information receiver having an output coupled to an input of the personalised service creator and adapted to receive change information enabling the service creation element to generate the personalised telecommunications service based on the telecommunications service; and e. a personalised service creator, further adapted to interpret the change information enabling the service creation element to generate a personalised telecommunications service based on the telecommunications service and create the personalised service.

The object of the invention is still further achieved by a software module for running on a processing system in a personalised service generation enabling device and for generating information enabling a service creation element to generate a personalised telecommunications service based on a telecommunications service, the software module comprising:

a. a telecommunications service accessing sub-module, adapted to provide the telecommunications service to a user;

b. a service generation information sub-module, having an input for receiving a change instruction and being adapted to translate the change instruction based on the telecommunications service, received via the telecommunications service accessing sub-module, to a service generation information which can be handled by the service creation element to change the telecommunications service; and c. a service generation information sending sub-module, co-operating with the service generation information sub-module and adapted to send the service generation information to the service creation element enabling the service creation element to create the personalised telecommunications service.

The object of the invention is yet further achieved by a software module for running on a processing system in a service creation element and for generating a personalised telecommunications service, the software module comprising:

a. a service creation sub-module, adapted to create a telecommunication service;

b. a personalised service creation sub-module, adapted to create a personalised telecommunications service;

c. a sending sub-module, co-operating with the service creation sub-module and adapted to provide a user with the telecommunications service;

d. a change information receiving sub-module, co-operating with the personalised service creation sub-module and adapted to receive change information enabling the service creation element to generate the personalised telecommunications service based on the telecommunications service; and e. a personalised service creation sub-module, further adapted to interpret the change information enabling the service creation element to generate a personalised telecommunications service based on the telecommunications service and create the personalised service.

Indeed, by providing a user access to the entire provided service, the user can, based on the provided service, determine the changes of the provided service he wishes and notify the personalised service generation enabling device hereof in order to generate a change information that enables the service creation environment to actually create a personalised service by adapting the originally provided service.

Another characteristic feature of the present invention is that in the personalised service generation enabling device and in the related software modules, the change instruction may be a user generated change instruction based on the telecommunications service, inputted via a computer terminal.

As a user of the service disposes of at least, reduced service creation environment, he is able to perform the desired changes in a provided service. In this way, he can decide by himself which service components and/or service characteristics needs to be changed in order to adapt the service provided by the telecommunications service provider to the specific need of this single user. The user notifies the personalised service generation enabling device hereof in order to enable this device to generate a change information that in its turn enables the service creation environment to actually create a personalised service by adapting the originally provided service.

A still further characteristic feature of the present invention is that the personalised service generation enabling device may further comprise a usage monitor coupled to an input of the service generation information provider and adapted to (i) monitor a use of the telecommunications service by the user to generate the change instruction based on the use and based on at least one predetermined rule, and (ii) apply the change instruction to the service generation information provider, these functions performed by an appropriate software module.

The service user-terminal possesses a means to monitor the actual service usage of the provided service. By comparing this actual service usage to the provided service, it is possible to determine the change information that enables the service creation environment to actually create a personalised service by adapting the originally provided service, based on the result of the comparison and a set of predetermined rules.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
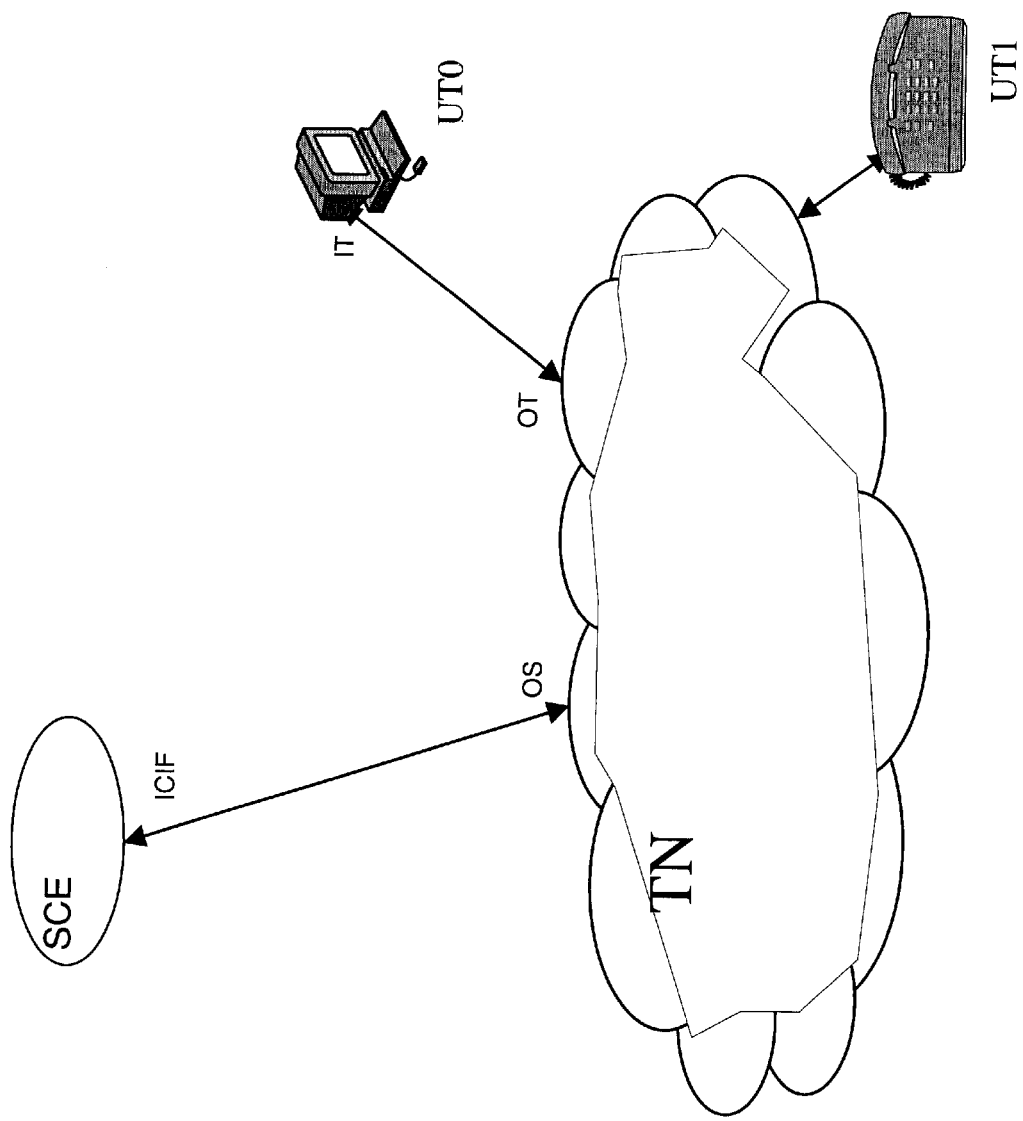
FIG. 1 represents a telecommunications network together with a coupled service creation element SCE and two user terminals UT0 and UT1.

In the following paragraphs, referring to the drawings, an implementation of the devices according to the present invention will be described. In the first paragraph of this description the main elements of this network and the main coupled elements as presented in FIG. 1 are described. Special attention will be drawn to the components of the service creation element and the components of the user-terminals. In the second paragraph, all connections between the before mentioned network elements and described components are defined. In the succeeding paragraph the actual execution of the personalised service provisioning is described. Thereafter, in the further description a second embodiment of the present invention is described. This second embodiment is described in such way that only the differences compared to the first embodiment are mentioned.

The essential elements of this embodiment of the present invention are a telecommunications network TN constituted by a public switched telecommunications network PSTN. This network can be implemented by any other telecommunications network, such as for example the internet. Further there is a service creation element SCE that enables a network provider as well as a service user to make changes in the service provided to each user. This service creation element has the entire provided service at its disposal.

In order to keep simplicity in this description it is chosen to only describe two user terminals UT0 and UT1 connected to the network although this normally will be a plurality of user-terminals. UT0 is a personal computer with a belonging screen, keyboard and a mouse. UT1 is a telephone terminal with some kind of application programmers interface API.

The service creation environment is via a Transmission Control Protocol over Internet Protocol, further referred to as a TCP/IP, connection and the necessary termination means coupled to the telecommunications network TN. Both user terminals are supposed to be connected to the network via a common PSTN-connection. In case of the personal computer UT0 additionally a modem is used for establishing the connection.

Figure 2:
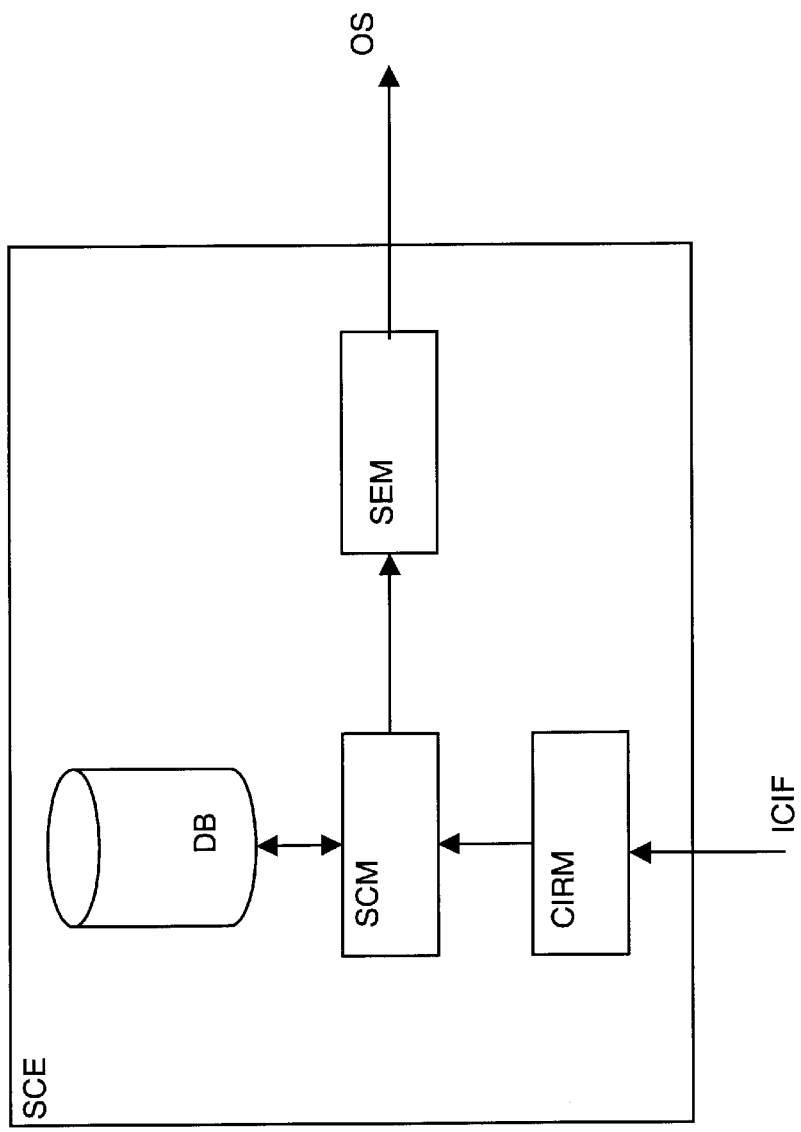
FIG. 2 represents an implementation of the service creation element SCE as presented in FIG. 1.

The service creation element SCE as presented in FIG. 2 is built up of a service creation means SCM that creates a telecommunications service and is able to create a personalised telecommunications service based on this telecommunications service.

Further there is a sending means SEM that in its turn is adapted to provide a user with the telecommunications service and a change information receiving means CIRM which is adapted to receive change information enabling the service creation element SCE to generate a personalised telecommunications service based on the telecommunications service. At last there is a database DB storing the created services.

The change information receiving means CIRM has an input-terminal which is also an input-terminal ICIF of service creation element SCE. The change information receiving means CIRM has an output-terminal which is also an input-terminal of the service creation means SCM which in its turn is coupled to a database DB. The service creation means SCM has another output-terminal which is coupled an input-terminal of the sending means SEM. Sending means SEM has an output-terminal which is also an output-terminal OS of the service creation element SCE.

Figure 3:
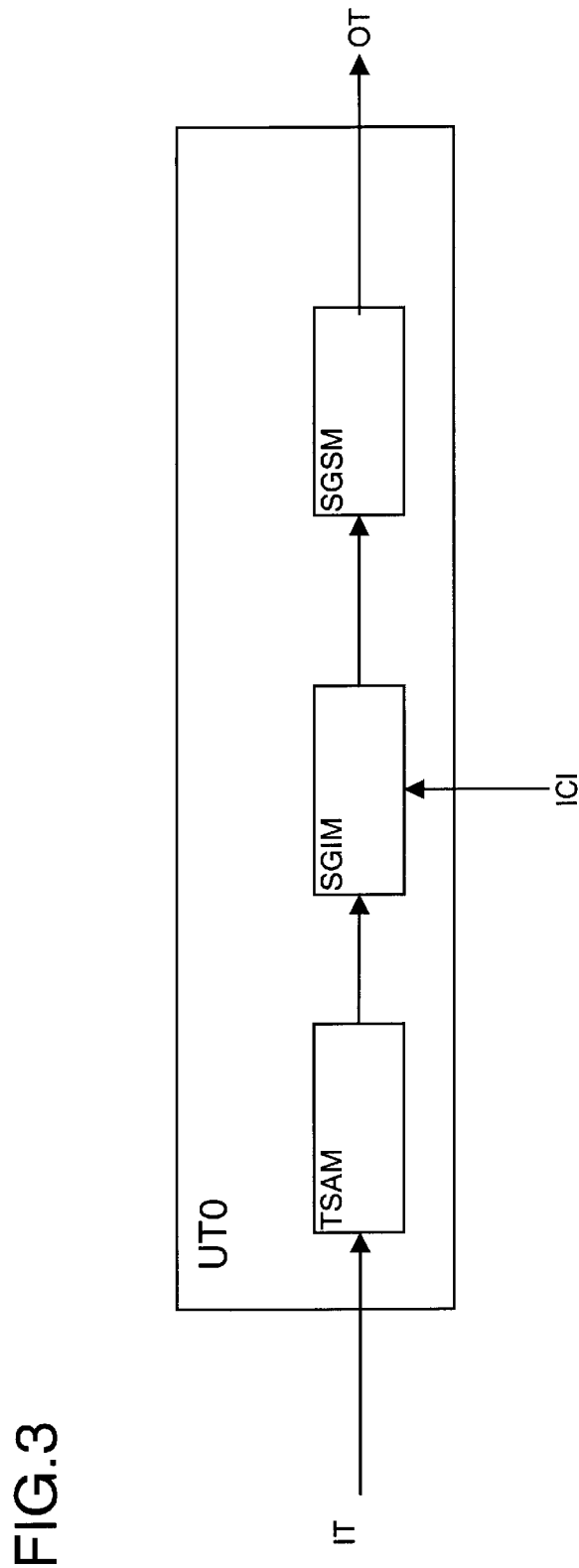
FIG. 3 represents an implementation of the user terminal UT0 and UT1 as presented in FIG. 1.

The user-terminal UT0 as presented in FIG. 3 is built up of a telecommunications service accessing means TSAM that is able to provide the telecommunications service available within the service creation element SCE to a user. Further there is a service generation information means SGIM that is able to translate a user generated change instruction based on the telecommunications service. This change instruction inputted via a computer terminal change instruction is translated by said service generation information means SGIM resulting in a service generation information which can be handled by said service creation element SCE to change the telecommunications service. Further there is a service generation information sending means SGSM that sends the service generation information to the service creation element SCE enabling the service creation element SCE to create the personalised telecommunications service.

The telecommunications service accessing means TSAM has an input-terminal that is also an input-terminal of the user-terminal UT0. The telecommunications service accessing means TSAM has an output-terminal which is coupled to an input-terminal of the service generation information means SGIM which has a second input-terminal ICI that is also an input-terminal of the user-terminal UT0. The service generation information means SGIM has an output-terminal which is coupled to an input-terminal of the service generation information sending means SGSM that in its turn has an output-terminal that is at the same time an output-terminal OT of the user-terminal UT0.

The user-terminal UT1 comprises the means as described for user-terminal UT0 but differs in that this terminal additionally possesses monitoring means (not shown) to monitor a use of the to the user provided telecommunications service in order to generate a change instruction that is based on a number of rules. This generated change instruction then is applied to the service generation information means via its second input-terminal.

In order to explain the operation of the present invention it is assumed that there is a telecommunications service, further referred to as the service installed within the telecommunications network TN, further referred to as network, and also running in this network. This means that this service is available to each of the user terminals UT0 and UT1.

It is further assumed that the service provided is not entirely satisfying the needs of a user of user-terminal UT1 while invocating the provided service. The user is enabled to change the provided service in such a way that he can use his service in the most efficient way only offering him the functionality he needs to use, this service is called the personalised service. To change the provided service in such way the user has personal computer UT0 at its disposal whereon the telecommunications accessing means TSAM is available that is able to retrieve the entire provided service or only a representation thereof and make the service visible on the personal computer screen. The user is able to make changes in the visual representation of the provided service by using drag and drop and a graphical user interface. Each of these user-actions is referred to as change instructions. The service generation information means SGIM translates all these user change instructions into a service creation element change instruction. All generated change instructions together represent the change of the provided service in order to get the personalised service. This service creation element change instruction is a change instruction that can be interpreted and taken into effect by the SCE. Subsequently the service generation information sending means SGSM transmits the service creation element change instruction towards the SCE through the telecommunications network TN. The change instruction receiving means CIRM of the SCE in its turn receives all transmitted service creation element change instructions and provides the service creation means SCM with these instructions. The service creation means SCM interprets each instruction in its turn and performs all changes to the provided service, in the end resulting in a personalised service. This personalised service is stored then in a customer specific storage area. Subsequently the personalised service is installed within the relevant network element with the network TN, making the service in this way accessible to the user of user terminal UT0.

In order to explain the operation of the present invention concerning the second embodiment it is assumed that the user of user terminal UT1 makes use of the provided telecommunications service.

It is further assumed that this user only often makes use of a number of particular features of the service and uses other features of the service less frequently.

This actual use is monitored by the monitoring means within the user-terminal UT1. This actual use is here also compared with the service functionality of the entire provided service functionality. Then there is a set of rules that in case of a certain behaviour of the user a change instruction will be derived from the rule that applies to the behaviour.

Such a rule could be "if the service user does not use feature X during a period of 14 days, then propose to remove service feature X", if the user always uses the same functionality then derive a shortcut for this functionality leaving out a number of not essential steps to get the functionality".

At this point, the change instruction is generated in a way that the user influences the generation of change instructions in an indirect way, the change instruction is provided to the service generation information means. This means will translate the provided change instruction in the same way as is done as described in the previous embodiment. All subsequent steps are performed in the same manner as described in the previous embodiment.

It is to be remarked that concerning the second embodiment, the example concerning the service feature usage is not restricting for the to be changed functionality. The changes may fall within a range up to service logic changes and also data changes.

It is further to be remarked that this generated personalised service may also be used as a base for changing and generating an updated personalised service.

Although the above embodiment of the invention has been described by means of functional blocks, their detailed realisation based on this functional description should be obvious for a person skilled in the art and is therefore not described.

While the principles of the invention have been described above in connection with specific apparatus, it is to be clearly understood that this description is made only by way of example and not as a limitation on the scope of the invention, as defined in the appended claims.

What is claimed is:

1. A personalised service generation enabling device for generating service generation information, wherein said device comprises:
   a. a telecommunications service accessor, adapted to provide said telecommunications service to a user;
   b. a service generation information provider, having a first input for receiving a change instruction and being adapted to translate said change instruction, based on said telecommunications service received via said telecommunications service accessor, to said service generation information which can be handled by a service creation element to change an originally provided service into a personalised telecommunications service based on a telecommunications service comprising at least one service component and created by said service creation element; and
   c. a service generation information transmitter having an input coupled to an output of said service generation information provider and adapted to send said service generation information to said service creation element to enable said creation element to create said personalised telecommunications service.

2. A personalised service generation enabling device according to claim 1, wherein said change instruction is a user generated change instruction based on said telecommunications service, inputted via a computer terminal to said service generation information provider.

3. A personalised service generation enabling device according to claim 1, further comprising a usage monitor coupled to a second input of said service generation information provider and adapted to (i) monitor a use of said telecommunications service by said user to generate said change instruction based on said use and based on at least one predetermined rule, and (ii) apply said change instruction to said service generation information provider.

4. A service creation element, for changing an originally provided service into a personalised telecommunications service based on a telecommunications service, said service creation element comprising:
   a. a service creator, adapted to create said telecommunications service, wherein said telecommunications service includes said originally provided service;
   b. a personalised service creator, adapted to create said personalised telecommunications service;
   c. a transmitter having an input coupled to an output of said service creator and adapted to provide a user with said telecommunications service; and
   d. a change information receiver having an output coupled to an input of said personalised service creator and adapted to receive change information enabling said service creation element to generate said personalised telecommunications service based on said telecommunications service;
   e. said personalised service creator being further adapted to interpret said change information enabling said service creation element to generate said personalised telecommunications service based on said telecommunications service and created said personalised telecommunications service.

5. A software module for running on a processing system for inclusion in a personalised service generation enabling device and for generating information, wherein said software module comprises:

a. a service creation element sub-module, adapted to enable a service creation element to change an originally provided service into a personalised telecommunications service based on a telecommunications service comprising at least one service component and created by said service creation element;
   b. a telecommunications service accessing sub-module, adapted to provide said telecommunications service to a user;
   c. a service generation information sub-module, having an input for receiving a change instruction and being adapted to translate said change instruction based on said telecommunications service, received via said telecommunications service accessing sub-module, to service generation information which can be handled by said service creation element to change said telecommunications service; and
   d. a service generation information sending sub-module, co-operating with said service generation information sub-module and adapted to send said service generation information to said service creation element enabling said service creation element to create said personalised telecommunications service.

6. A software module according to claim 5, wherein said change instruction is a user generated change instruction based on said telecommunications service, inputted via a computer terminal to said telecommunications service accessing sub-module.

7. A software module according to claim 5, wherein said software module further comprises a sub-module, co-operating with said service generation information sub-module, and adapted to monitor a use of said telecommunications service by said user to generate said change instruction based on said use and on at least one predetermined rule and to apply said change instruction to said service generation information sub-module.

8. A software module, for running on a processing system, for inclusion in a service creation element and for changing an originally provided service into a personalised telecommunications service based on a telecommunications service, said software module comprising:
   a. a service creation sub-module, adapted to create said telecommunications service, wherein said telecommunications service includes said originally provided service;
   b. a personalised service creation sub-module, adapted to create said personalised telecommunications service;
   c. a sending sub-module, co-operating with said service creation sub-module and adapted to provide a user with said telecommunications service;
   d. a change information receiving sub-module, co-operating with said personalised service creation sub-module and adapted to receive change information enabling said service creation element to generate said personalised telecommunications service based on said telecommunications service; and
   e. said personalised service creation sub-module being further adapted to interpret said change information enabling said service creation element to generate said personalised telecommunications service based on said telecommunications service and create said personalised telecommunications service.

* * * * *